United States Patent [19]

Nakamura et al.

[11] Patent Number: 5,410,563
[45] Date of Patent: Apr. 25, 1995

[54] LASER BEAM OPTICAL SYSTEM CAPABLE OF COMPENSATING FOCAL LENGTH CHANGES THEREOF

[75] Inventors: Hiromu Nakamura; Satoru Ono, both of Toyokawa, Japan

[73] Assignee: Minolta Co., Ltd., Osaka, Japan

[21] Appl. No.: 130,100

[22] Filed: Sep. 30, 1993

[30] Foreign Application Priority Data

Oct. 2, 1992 [JP] Japan .................. 4-265026

[51] Int. Cl.⁶ ............................................. H01S 3/08
[52] U.S. Cl. ................................ 372/101; 372/95; 372/99; 372/108
[58] Field of Search ............... 372/101, 98, 99, 108, 372/95, 24

[56] References Cited

U.S. PATENT DOCUMENTS 3,750,189  7/1973  Fleischer .
4,477,909  10/1984  Salvi et al. ........................ 372/99

FOREIGN PATENT DOCUMENTS 1206682  8/1989  Japan .
2168220  6/1990  Japan .
356901   3/1991  Japan .

Primary Examiner—Léon Scott, Jr.
Attorney, Agent, or Firm—Price, Gess & Ubell

[57] ABSTRACT

A laser beam light source device which has Fresnel lens having grating of unequal spacing and facing a laser diode, and condenser lens made of resin. The focal length of the condenser lens is set at a value which nullifies changes in the focal length of the Fresnel lens induced by fluctuations in the oscillation wavelength of the laser diode accompanying temperature change, and changes in the focal length of the Fresnel lens accompanying temperature change. Further a laser beam scanning optical system for scanning on a scan line via a deflecting device and optical elements by a laser beam emitted from a laser light source based on image information. In the laser scanning optical system, a pair of anamorphic lenses are disposed anteriorly and posteriorly to the deflecting device to correct surface tilt of the deflecting device, one of the anamorphic lens being a Fresnel lens, another of the anamorphic lens being made of resin.

8 Claims, 4 Drawing Sheets

LASER BEAM OPTICAL SYSTEM CAPABLE OF COMPENSATING FOCAL LENGTH CHANGES THEREOF

BACKGROUND OF THE INVENTION

1. Field of the Invention

The present invention relates to a laser beam optical system which includes a laser beam light source and a laser beam scanning optical system for use in reading and writing images.

2. Description of the Related Art

Conventional laser light sources of the optical disk pick-up and laser printer image-writing head which uses a Fresnel lens as a collimator lens are well known.

Japanese Laid-Open Patent Application No. 3-56901, for example, discloses a collimator lens system construction having a Fresnel lens configuration capable of correcting variations in refractive index (typically, the refractive index is a function of the wavelength) produced when the laser diode oscillation wavelength fluctuates. However, in the aforesaid collimator lens system, consideration is given neither to the variations in focal length arising from shape variations caused by expansion of the Fresnel lens material in conjunction with the heat generated by the laser diode, nor variations in the focal length arising from variations in the refractive index of the lens material itself caused by temperature fluctuations. A Fresnel lens necessarily must be made of resin material for ease of manufacture, however, correction of variations in focal length in accordance with changes of shape and refractive index caused by temperature fluctuation are unavoidable.

Japanese Laid-Open Patent Application No. 1-206682 discloses an arrangement which cancels out the variations in focal length of the Fresnel lens when wavelength fluctuations occur due to the heat generated by the laser diode with changes in focal length based on changes in the grating spacing due to heat expansion of the lens material. Since the lens surfaces other than the Fresnel lens are flat in this lens system, said lens materials are limited to materials having a large thermal expansion coefficient when used to correct the focal lens by changing the grating spacing of the Fresnel lens because such focal lens correction can only be accomplished via the Fresnel lens. However, this arrangement does not consider changes in focal length based on variations in refractive index of the lens material induced by temperature changes.

Laser beam scanning optical systems used as the image-writing head of a laser printer provide an arrangement of a pair of anamorphic lenses in disposed anteriorly and posteriorly to a deflecting device to correct surface tilt of the reflective surfaces of the deflecting device (polygonal mirror) (refer to U.S. Pat. No. 3,750,189). Heretofore, these anamorphic lenses have been made of glass, but in recent years such anamorphic lenses made of polycarbonate resins and the like have been developed. However, resin lenses provide weak power characteristics as the refractive index is reduced with increasing temperature, and the focal length changes in the positive direction (lengthening direction).

On the other hand, an anamorphic lens construction via axial symmetry of the grating of Fresnel lenses having a diffraction effect has been disclosed in Japanese Laid-Open Patent Application No. 2-168220. When such an anamorphic Fresnel lens is used to correct surface tilt of the deflecting device, the focal length changes in the negative direction (shortening direction) due to enlargement of the grating spacing accompanying a temperature rise. In any case, if the lens focal point and length change, the beam spot moves on the image forming surface (scan line), thereby reducing image quality.

SUMMARY OF THE INVENTION

A main object of the present invention is to provide a laser beam light source device which is stable relative to temperature variations without producing changes in the focal length.

Another object of the present invention is to provide a laser beam optical system optimally suitable for high-resolution laser printers.

A further object of the present invention is to provide a laser beam light source device capable of correcting changes in focal length induced by form changes of the Fresnel lens accompanying variations in temperature and changes in focal length due to fluctuation of the oscillation wavelength of the laser diode accompanying said temperature changes, and further capable of correcting changes in focal length induced by changes in the refractive index of a Fresnel lens caused by temperature variations, hitherto unconsidered.

A still further object of the present invention is to provide a laser beam scanning optical system capable of minimizing spot motion of a beam on the scan line accompanying temperature change.

These and other objects of the present invention are achieved by providing a laser beam light source device provided with a laser diode, Fresnel lens surface comprising grating of unequal spacing, and condenser lens surface made of resin, wherein the focal length of said condenser lens surface is set at a value which nullifies changes in the focal length of said Fresnel lens surface induced by fluctuations in the oscillation wavelength of said laser diode accompanying temperature change, and nullifies changes in the focal length of said Fresnel lens surface accompanying temperature change.

These and other objects of the present invention are further achieved by providing a laser beam scanning optical system for scanning on a scan line via a deflecting device and optical elements by means of a laser beam emitted from a laser light source based on image information, wherein a pair of anamorphic lenses are disposed anteriorly and posteriorly to said deflecting device to correct surface tilt of said deflecting device, one said anamorphic lens being a Fresnel lens, another said anamorphic lens being made of resin.

These and other objects, advantages and features of the invention will become apparent from the following description thereof taken in conjunction with the accompanying drawings which illustrate specific embodiments of the invention.

BRIEF DESCRIPTION OF THE DRAWINGS

In the following description, like parts are designated by like reference numbers throughout the several drawings.

DETAILED DESCRIPTION OF THE PREFERRED EMBODIMENTS

Figure 1:
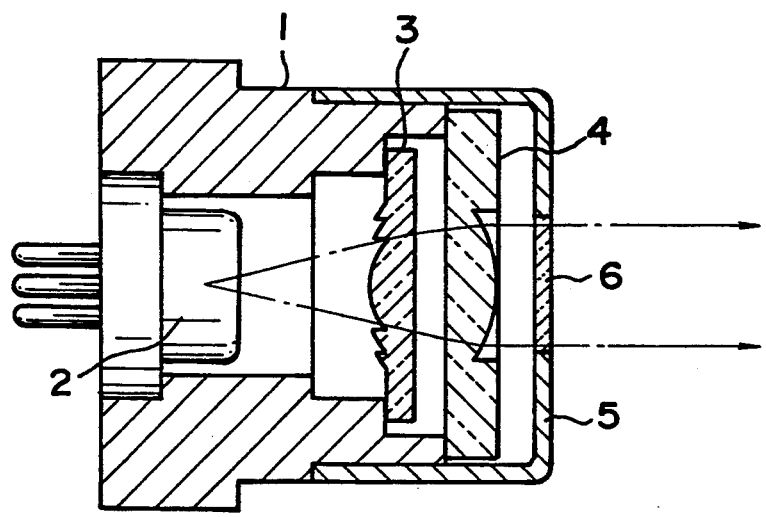
FIG. 1 is a section view of the laser beam light source unit of a first embodiment of the invention.
Figure 2:
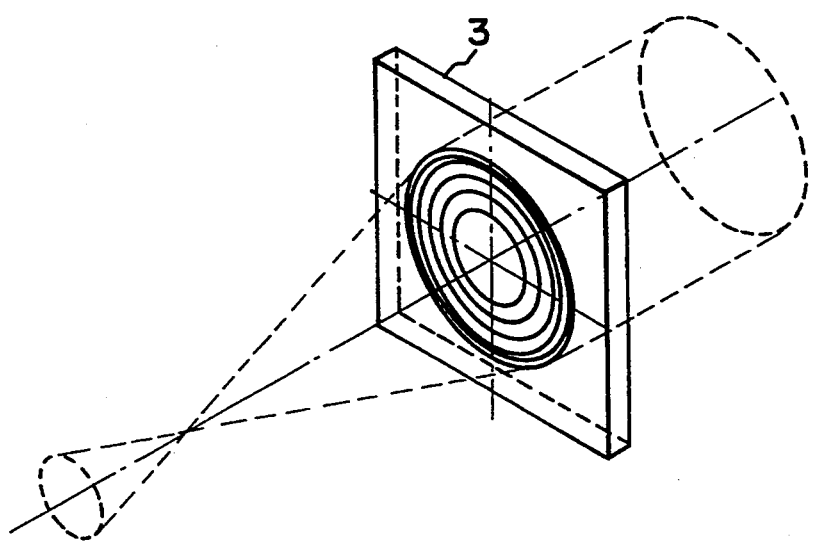
FIG. 2 is a perspective view of the Fresnel lens of FIG. 1.

The embodiments of the present invention are described hereinafter with reference to the accompanying drawings.

The laser beam light source unit comprises a semiconductor laser diode 2 accommodated in the back of a holder 1, and Fresnel lens 3 and spherical lens 4 mounted on the front side of said holder 1, the front side of said holder 1 being protected by a protective cap 5. A transparent glass plate 6 is disposed in the center of said protective cap 5.

The laser diode 2 is a well-known type, and emits diffuse light from an interface surface via a supplied electrical current. The Fresnel lens 3 is made of a plastic resin, and has unequally spaced gratings of micron order, of serrated cross section. The Fresnel lens 3 has a refractive effect and diffractive effect, which bends light via each portion of its grating. When parallel light rays enter, they converge at a point (focal point), and the diffuse light emanating from said focal point is collimated. The spherical lens 4 is made of a plastic resin, and its center is a spherical surface of uniform curvature expanded toward the outer side.

In the aforesaid laser beam light source unit, a laser beam emitted from the laser diode 2 is converged by the Fresnel lens 3 to diffuse light of uniform angle, and is collimated by the spherical lens 4 to substantial parallel rays. That is, the Fresnel lens 3 and spherical lens 4 forms the collimator lens system which converges the laser beam emitted from the laser diode 2.

Figure 3:
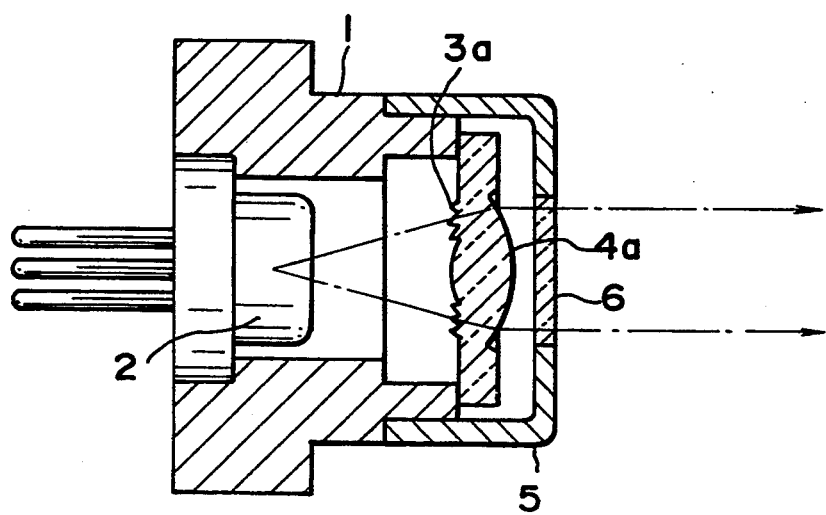
FIG. 3 is a section view of the leaser beam light source unit of a second embodiment of the invention.

FIG. 3 shows the laser beam light source unit of a second embodiment of the invention.

This laser beam light source unit is provided with a collimator lens system having a single resin lens, comprising a Fresnel lens surface 3a disposed on the side at which the laser beam enters, and a spherical lens surface 4a disposed at the side at which said laser beam exits the lens system. In other respects the unit is constructed identically to the unit shown in FIG. 1; like parts are designated by like reference numbers in both drawings.

The focal length of the aforesaid collimator lens system changes in accordance with changes in temperature. The relationship between the focal length of the collimator lens system and the focal lengths of the Fresnel lens surface 3a and the spherical lens surface 4a is expressed in Equation 1 below.

$$\frac{1}{fCO} = \frac{1}{fFL} + \frac{1}{fPL} - \frac{e}{fFL \cdot fPL} \quad (1)$$

In Eq. 1, the following obtain:
fCO: focal length of collimator lens system
fFL: focal length of Fresnel lens
fPL: focal length of spherical lens
e: principal point distance When Eq. 1 is differentiated, the changes in the focal length of the collimator lens system can be expressed by Eq. 2 below.

$$\frac{\Delta fCO}{fCO^2} = \frac{\Delta fFL}{fFL^2}\left(1 - \frac{e}{fPL}\right) + \frac{\Delta fPL}{fPL^2}\left(1 - \frac{e}{fFL}\right) \quad (2)$$

Fluctuation of the principal point distance e is extremely small and may be ignored. The collimator lens system may be set such that the right side of Eq. 2 equals zero [0] even with temperature changes.

Conversely, as described in Japanese Laid-Open Patent Application No. 1-206682, the focal length fPL is infinity when a lens combined with a Fresnel lens provides a plane lens, and the amount of change $\Delta fPL$ is zero [0]. Accordingly, in the aforesaid case, the amount of change of the focal length of the Fresnel lens $\Delta fFL$ must be zero [0]. However, the oscillation wavelength of the laser diode changes from $\lambda$ to $\lambda'$, i.e., $\lambda + \Delta\lambda$, in conjunction with a rise in temperature $\Delta T$. Furthermore, when the linear expansion coefficient of the resin material of the Fresnel lens is designated $\alpha$, the amount of change in the focal length of the Fresnel lens $\Delta fFL$ can be expressed by Equation 3 below.

$$\Delta fFL = \left(-\frac{\Delta\lambda}{\lambda'} + \alpha\Delta T(\alpha\Delta T + 2)\right)fFL \quad (3)$$

Accordingly, when a lens combined with a Fresnel lens provides a plane surface lens, materials which possess the linear expansion coefficient $\alpha$ must be selected to satisfy Eq. 3 so as to have the amount of change of the focal length of the collimator lens system $\Delta fCO$ set at zero [0]. In order to satisfy the expression $\Delta fFL=0$, the value $\alpha$ must be relatively large because the value of $(\Delta\lambda/\lambda')$ in Eq. 3 is relatively large. However, resin materials possessing such an $\alpha$ value are particularly unstable.

In the present embodiment, a lens 4 to be combined with a Fresnel lens 3 has a constant focal length so as to nullify the amount of change $\Delta fFL$ by the amount of change $\Delta fPL$. During the temperature rise $\Delta T$, the amount of change in the focal length of the spherical lens 4 $\Delta fPL$ is expressed by the Equation 4 below.

$$\Delta fPL = \left(\frac{\Delta n1 + \Delta n2}{1 - n} + \alpha'\Delta T\right)fPL \quad (4)$$

In Eq. 4, the following obtains:
$\alpha'$: spherical lens linear expansion coefficient
n: spherical lens refractive index
$\Delta n1$: amount of change of refractive index during temperature rise $\Delta T$
$\Delta n2$: amount of change of refractive index during fluctuation $\Delta\lambda$ The following Equation 5 can be derived from the previously described Eqs. 2, 3 and 4. If Eq. 5 is satisfied, the amount of change of the focal length of the collimator lens system $\Delta fCO$ is set at zero [0], such that variations of the focal length due to temperature changes can be prevented.

$$\frac{\Delta fCO}{fCO^2} = \left(-\frac{\Delta\lambda}{\lambda'} + \alpha\Delta T(\alpha\Delta T + 2)\right)\left(1 - \frac{e}{fPL}\right)/fFL + \quad (5)$$

-continued $$\left(\frac{\Delta n1 + \Delta n2}{1-n} + \alpha \Delta T\right)\left(1 - \frac{e}{fFL}\right)/fPL \approx 0$$

In the present embodiment, the values $\alpha$, $\alpha'$, n, $\Delta n1$, $\Delta n2$ are determined by the material of the Fresnel lens 3 and spherical lens 4, and the values $\lambda'$, $\Delta\lambda$ are determined by the type of laser diode 2. When fCO is set at a constant value, the values e, fFL and fPL may be set so as to satisfy the conditions of Eqs. 1 and 5. If a single lens is used such as is shown in FIG. 3, the values of $\alpha$ and $\alpha'$ may be identical.

Specific numerical examples are used below in the discussion of the second embodiment shown in FIG. 3.

Laser diode

Oscillation wavelength $\lambda$ at 20° C.: 780 nm
Oscillation wavelength $\lambda'$ at 40° C.: 785 m
Amount of change in wavelength $\Delta\lambda$ at $\Delta T$, 20° C.: 5 nm Collimator lens system: polycarbonate Linear expansion coefficient $\alpha$: $8 \times 10^{-5}$
Refractive index at 20° C., 780 nm: 1.57222
Refractive index at 40° C., 785 nm: 1.56983
Amount of change in refractive index $\Delta n = \Delta n1 + \Delta n2$: $-0.00239$ If fFL is set at 12 mm, fPL is set at 1.5 mm, and e is set at 1.5 mm at 20° C., then said values fluctuate to fFL'=11.962 mm, fPL'=21.62484 mm, and e'=1.502 mm (e fluctuates only $\alpha\Delta T$) when the temperature rises to 40° C., such that $\Delta$fCO becomes:

$\Delta$fCO=0.0002 mm=0.2 $\mu$m

As shown in FIG. 1 and 3, the laser beam light source unit may be used with laser printers, image readers, optical disk pick-up and the like. The aforesaid amount of change in focal length $\Delta$fCO, i.e., 0.2 $\mu$m, may be ignored from a practical standpoint.

In the first embodiment (refer to FIG. 1), the Fresnel lens surface of the Fresnel lens 3 confronted the laser diode 2, and the power surface of the spherical lens 4 confronted the exterior side of the holder 1. The Fresnel lens surface may be protected with the aforesaid arrangement.

When the previously described laser beam light source unit is used as an image-writing head of a laser printer, an anamorphic lens such as a cylindrical lens may be used in place of the spherical lens 4 in consideration of correction of the surface tilt of the polygonal mirror. When a cylindrical lens is used, the value of fPL in each of the aforesaid equations can be set at a focal length in the subscanning direction of said cylindrical lens (subscanning direction is a direction perpendicular to the main scanning direction of the polygonal mirror). In such a case, the change in focal length accompanying changes in temperature may be corrected only in the subscanning direction. In an optical system which corrects for surface tilt of the polygonal mirror, it is essential that the focal length is corrected in the subscanning direction.

Figure 4:
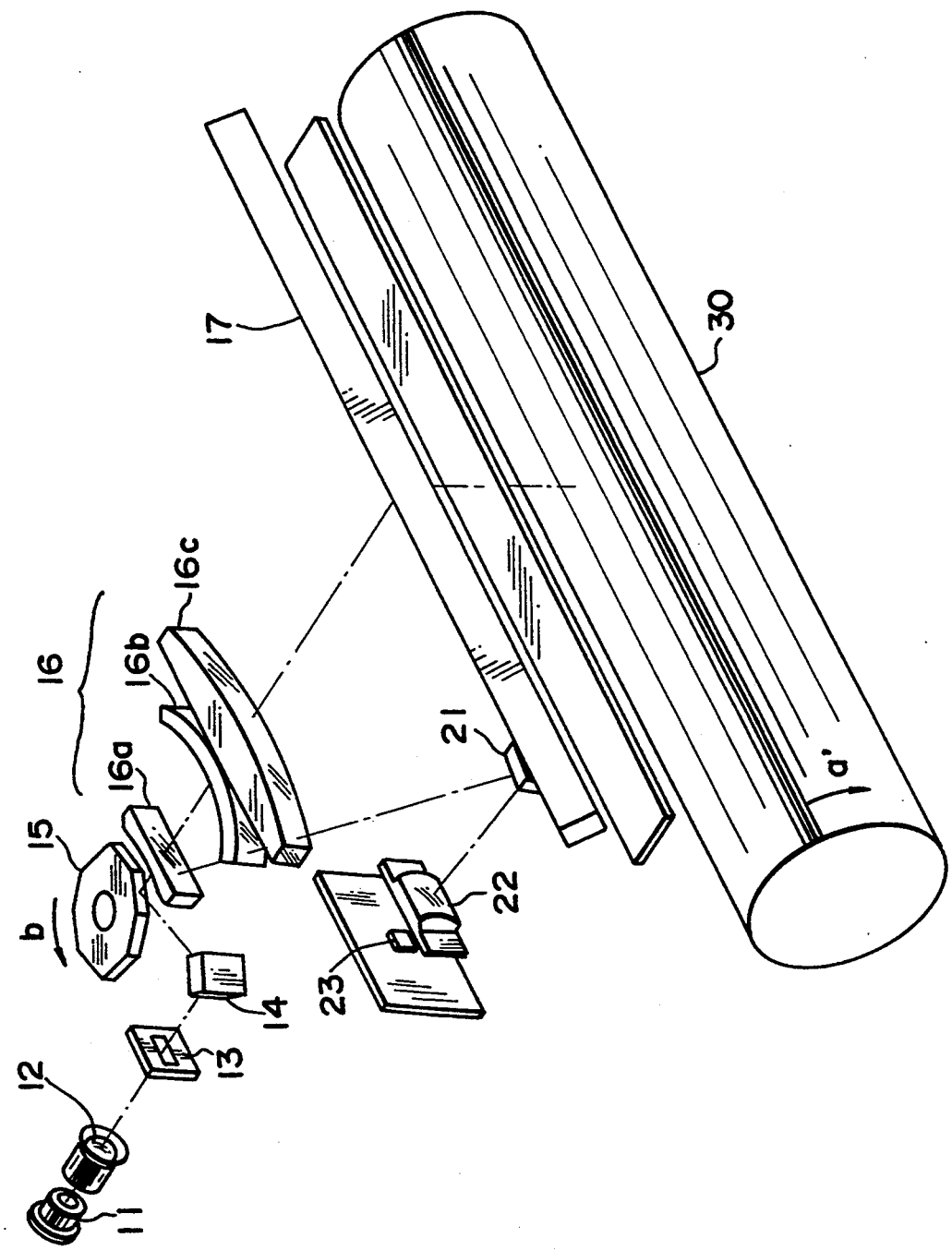
FIG. 4 is a perspective view of the laser beam scanning optical system of a third embodiment of the invention.
Figure 5:
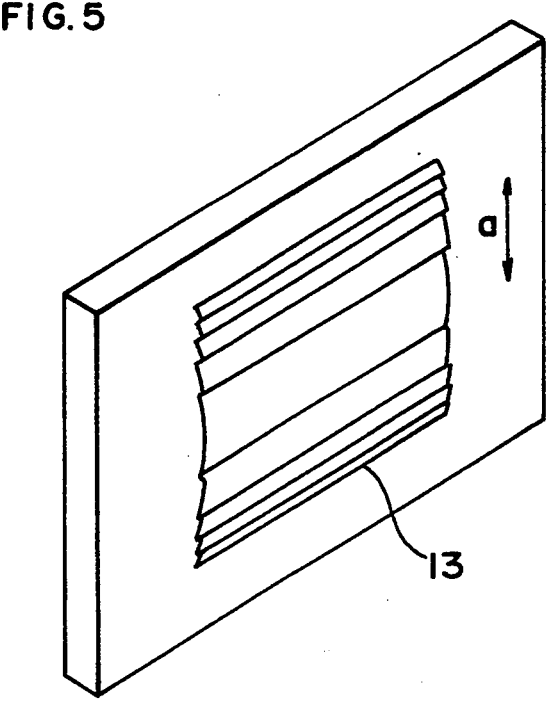
FIG. 5 is a perspective view of the Fresnel leans of FIG. 4.
Figure 6:
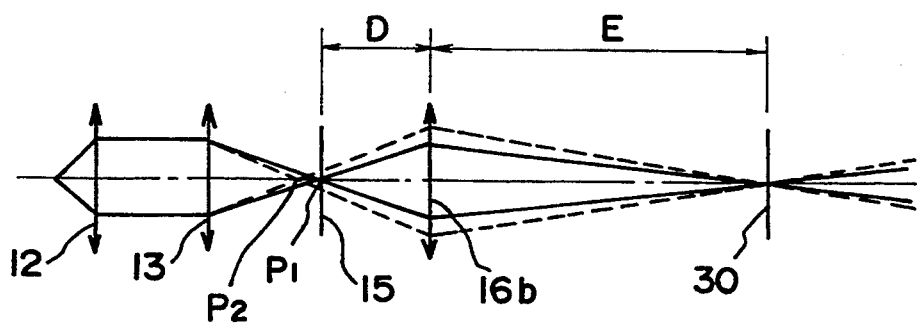
FIG. 6 is an illustration showing the convergence state in the subscanning direction of the laser beam of the scanning optical system of FIG. 4.

A third embodiment of the laser beam scanning optical system of the present invention is described hereinafter with reference to FIGS. 4 through 6.

The present laser beam scanning optical system comprises a laser diode 11, collimator lens 12, Fresnel lens 13, first folding mirror 14, polygonal mirror 15, f$\theta$ lens 16, second folding mirror 17, image writing start position sensor 23, mirror 21 for directing the laser beam to said sensor 23, and cylindrical lens 22 disposed directly anterior to said sensor 23. The Fresnel lens 13 has a symmetrical grating and power only in the subscanning direction as indicated by the arrow a in FIG. 5. The f$\theta$ lens 16 comprises a spherical concave lens 16a, toroidal lens 16b with toric surface, and spherical convex lens 16c. The toroidal lens 16b is made of resin, whereas the other lenses 16a and 16c are made of glass.

The laser beam emitted from the laser diode 11 is collimated into parallel rays by the collimator lens 12, and formed into linear rays coincident with the deflecting surface in the vicinity of the reflecting surface of the polygonal mirror 15 via the Fresnel lens 13. The polygonal mirror 15 is rotatably driven at constant speed in the arrow b direction, such that the laser beam is continuously deflected at a equiangular speed. The scanning laser beam passes through the f$\theta$ lens 16, and thereafter is reflected by the mirror 17 and forms an image on the surface of the photosensitive drum 30. At this time, the laser beam scans the surface of the photosensitive drum 30 in the axial direction at constant speed; this is referred to as the main scan. Scanning in conjunction with the rotation of the photosensitive drum 30 in the arrow a' direction is referred to as the subscan.

In the previously described construction, an image (electrostatic latent image) is formed on the surface of the photosensitive drum 30 by means of the aforesaid main scan and subscan via the turning ON and OFF of the laser beam emitted from the laser diode 11. The f$\theta$ lens 16 corrects the laser beam scanning speed relative to the main scan direction so as to be equal across both ends from the center of the scanning area. The Fresnel lens 13 corrects errors of surface tilt of the polygonal mirror 15 in conjunction with the toroidal lens 16b.

The amount of change in the focal length $\Delta$fFL accompanying temperature change when the Fresnel lens 13 is used as the means for correcting the surface tilt of the polygonal mirror 15, is expressed in the aforesaid Eq. 3. When the amount of change in temperature $\Delta T$ is 20° C., and the oscillation wavelength $\lambda'$ is 785 nm, the amount of change $\Delta\lambda$ is 5 nm; when the linear expansion coefficient $\alpha$ of the lens material (polycarbonate) is $8 \times 10^{-5}$ the temperature is 20° C., and the focal length fFL is set at 30 mm, the amount of change in focal length $\Delta$fFL is $-0.096$ mm.

Conversely, when a cylindrical lens made of resin is used in place of the Fresnel lens 13, the amount of change in the focal length is expressed by Eq. 4. When the amount of change in temperature $\Delta T$ is 20° C., the linear expansion coefficient $\alpha'$ of the lens material (polycarbonate) is $8 \times 10^{-5}$ the refractive index at temperature T (20° C.) is 1.57222, the amount of change in the refractive index $\Delta n$ ($\Delta n1 + \Delta n2$ in FIG. 4) is 0.0022, and the focal length is set at 30 mm at temperature T (20° C.), the amount of change in focal length $\Delta$fPL is about +0.127 mm derived from Eq. 4. That is, the focal length changes in the negative direction in anamorphic lens made of resin relative to changes in the negative direction in anamorphic Fresnel lens and in conjunction with a rise in environmental temperature. Accordingly, in the present embodiment, a pair of anamorphic lenses are used to correct surface tilt of the polygonal mirror 15, and the anterior stage anamorphic lens therein is a Fresnel lens 13 whereas the posterior stage anamorphic lens therein is a toroidal lens 16b made of resin, such that the respective changes of the focal length during rising temperature is nullified. As shown in FIG. 6, the focal length of the Fresnel lens 13 changes in the negative direction from P1 to P2 in conjunction with the temperature rise, and the amount of said change is nullified by the change of the focal length of the toroidal lens 16b in the positive direction, such that not only does the optical system maintain high resolution, but there is virtually no beam spot movement on the surface of the photosensitive drum 30.

More specifically, the distance D from the image forming position of the anterior stage anamorphic lens to the toroidal lens 16b is 50 mm, the distance E from the toroidal lens 16b to the image forming position of the overall scanning optical system is 200 mm, lateral magnification of the optical system in the subscan directing is 4, the focal length of the toroidal lens 16b in the subscan direction is 40 mm, and the focal length of the anterior stage anamorphic lens is set at 30 mm. The beam spot on the surface of the photosensitive drum 30 is 100 μm at 20° C.

When the temperature rises from 20° C. to 40° C. (ΔT=20° C.), the focal length of the toroidal lens changes to 40.234. Fluctuations in the beam spot on the surface of the photosensitive drum 30 are shown in Table 1 when the aforesaid Fresnel lens 13 is used as the anterior stage anamorphic lens, when a cylindrical lens made of glass is used, and when a lens made of acrylic is used. As can be clearly understood from the data of Table 1, if the Fresnel lens 13 is used as the anterior anamorphic lens, the change in focal length accompanying temperature rise is nullified by the toroidal lens 16b, i.e., the posterior anamorphic lens. This arrangement provides extremely small fluctuation in beam spot on the surface of the photosensitive drum 30 compared to that when a cylindrical lens made of glass is used.

TABLE 1

| Anterior anamorphic lens type | Distance D (mm) | Distance E (mm) | Beam spot (μm) |
|---|---|---|---|
| Fresnel | 50.096 | 204.38 | 109 |
| Cylindrical (glass) | 50 | 205.99 | 116 |
| Cylindrical (acrylic) | 49.873 | 208.17 | 129 |

In the third embodiment, the posterior stage anamorphic lens is a toroidal lens 16b made of resin and comprising the fθ lens 16, and is used as the means for correcting surface tilt of the polygonal mirror 15. However, it is to be understood that various other types of anamorphic lenses may be used other than said toroidal lens 16b. Furthermore, a Fresnel lens may be used as the posterior stage anamorphic lens, and a resin lens may be used as the anterior stage cylindrical lens. The configuration of the various combinations of optical elements other than the means for correcting surface tilt are optional.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A laser beam light source device comprising:
   a semiconductor laser diode for providing a laser beam;
   a plastic resin Fresnel lens surface comprising grating of an unequal spacing for optically modifying the laser beam emitted by the semiconductor laser diode; and
   a condenser lens surface made of a plastic resin for condensing the laser beam as modified by the Fresnel lens surface, wherein a focal length of said condenser lens surface is set at a value which nullifies any changes in a focal length of said Fresnel lens surface induced by fluctuations in the oscillation wavelength of said laser beam provided by said semiconductor laser diode accompanying a temperature change of said laser diode, and nullifies any changes in the focal length of said Fresnel lens surface accompanying a temperature change of said Fresnel lens.

2. The laser beam light source device as claimed in claim 1, wherein said Fresnel lens surface and condenser lens surface are integrally formed as one lens so that one side is said Fresnel lens surface and the other side is said condenser lens surface.

3. The laser beam light source device as claimed in claim 1, wherein said condenser lens surface is a spherical lens surface.

4. The laser beam light source device as claimed in claim 3, wherein said Fresnel lens surface faces said semiconductor laser diode, and said spherical lens surface faces opposite direction to said laser diode.

5. A laser beam scanning optical system for scanning a photosensitive member by means of a laser beam emitted from a laser light source so as to form an image on the photosensitive member, comprising:
   a deflector which deflects the laser beam emitted from the laser light source;
   a first anamorphic lens disposed anteriorly to said deflector to correct a surface tilt of said deflector; and
   a second anamorphic lens disposed posteriorly to said deflector to correct a surface tilt of said deflector, wherein changes in a focal length of said first anamorphic lens accompanying a temperature change of said first anamorphic lens is nullified by changes in a focal length of said second anamorphic lens accompanying a temperature change of said second anamorphic lens.

6. The laser beam scanning optical system claimed in claim 5, wherein said first anamorphic lens is a Fresnel lens and said second anamorphic lens is made of resin.

7. The laser beam scanning optical system claimed in claim 5, wherein said first anamorphic lens is made of resin and said second anamorphic lens is a Fresnel lens.

8. A laser beam scanning optical system for scanning a photosensitive member by means of a laser beam emitted from a laser light source so as to form an image on the photosensitive member, comprising:
   a deflector which deflects the laser beam emitted from the laser light source; and
   a pair of anamorphic lenses disposed anteriorly and posteriorly to said deflector to correct the surface tilt of said deflector, wherein one of said anamorphic lenses is a Fresnel lens and the other one of said anamorphic lenses is made of resin.

* * * * *